United States Patent
Cook

[15] 3,685,031

[45] Aug. 15, 1972

[54] DIGITAL RECORDING APPARATUS

[72] Inventor: Robert A. Cook, Norman, Okla.

[73] Assignee: Metrodata Systems Inc., Norman, Okla.

[22] Filed: June 2, 1970

[21] Appl. No.: 42,834

[52] U.S. Cl......340/174.1 K, 179/100.2 S, 324/99 D, 340/183, 340/204, 340/336

[51] Int. Cl. ...G08c 19/28, G11b 27/30, H03k 13/02

[58] Field of Search....340/181, 183, 174.1, 174.1 K; 179/100.2 Z

[56] References Cited

UNITED STATES PATENTS

| | | | |
|---|---|---|---|
| 3,103,001 | 9/1963 | Hage | 340/183 |
| 3,552,751 | 1/1971 | Kelso | 179/100.2 Z |
| 3,323,107 | 5/1967 | Du Vall | 340/183 |
| 3,581,014 | 2/1970 | Vogel | 340/181 |
| 3,145,374 | 8/1964 | Benner | 340/183 |

*Primary Examiner*—Howard W. Britton
*Attorney*—Dunlap, Laney, Hessin & Dougherty

[57] ABSTRACT

Apparatus for recording either analog or digital input information in selected digital format on cartridge-contained endless magnetic tape. The apparatus consists of digital data conversion means for receiving input digital data, or digital data as derived from time sequentially sampled analog input data converted to digital data form. The converted digital data information is shifted through an assembly register with selected real time binary data, and removal from the assembly register takes place at clock-controlled rate in accordance with predetermined control logic such that serial time digital data followed by successive ones of a plurality of binary coded data values for each of a plurality of input channels are recorded sequentially on the magnetic tape cartridge.

11 Claims, 7 Drawing Figures

INVENTOR
ROBERT A. COOK

BY
Dunlap, Laney, Hessin & Dougherty
ATTORNEYS

PATENTED AUG 15 1972

3,685,031

SHEET 2 OF 6

INVENTOR
ROBERT A. COOK

BY Dunlap, Laney, Hessin & Dougherty
ATTORNEYS

INVENTOR
ROBERT A. COOK

BY
Dunlap, Laney, Hessin & Dougherty
ATTORNEYS

INVENTOR
ROBERT A. COOK

BY
Dunlap, Laney, Hessin & Dougherty
ATTORNEYS

INVENTOR
ROBERT A. COOK

BY
Dunlap, Laney, Hessin & Dougherty
ATTORNEYS

INVENTOR
ROBERT A. COOK
BY
Dunlap, Laney, Hessin & Dougherty
ATTORNEYS

DIGITAL RECORDING APPARATUS

BACKGROUND OF THE INVENTION

1. Field of the Invention

The invention relates generally to digital recording apparatus and, more particularly, but not by way of limitation, it relates to improved digital recording apparatus of the type which enables recording of plural channels of input data along with real time information on a standard cartridge-contained tape record.

2. Description of the Prior Art

The prior art includes numerous types of digital recording equipment which operate with any of various code adaptations to perform many different recording functions. There are many digital recording devices within the prior art which are concerned greatly with high speed recording of large volumes of digital information as input in a selected code form. Still other areas of the digital recording art are concerned less with speed and volume of recording and are directed to digital recording functions characteristic of a particular technical endeavor or engineering application. Thus, for example, the area of a seismic data processing requires digital recording measures of specific nature having inherit and characteristic requirements peculiar to that particular art. The same applies to other specific technological applications of digital recording, each of which employs particular structure required to carry out the specific ends, and the present invention would fall into a category where its specific structural requirements should tend to distinguish it from the bulk of prior art identified generally as digital data recording.

SUMMARY OF THE INVENTION

The present invention contemplates a digital recording system wherein plural channels of digital data and real time indications are recorded in predetermined sequence on a standard type of endless magnetic tape as contained in a cartridge housing. In a more limited aspect, the invention consists of a digital recording apparatus which is adapted to receive plural channels of input analog data to provide successive samplings of the plural channels of data in sequential output to an analog to digital converter which, in turn, applies parallel binary coded data information for each sequential channel of data to a parallel-to-serial converter; whereupon, data for each channel is then output sequentially as three-character binary coded decimal data for input to an assembly register. Real time in the form of two three-character binary coded decimal channels is also input to the assembly register, which assembly register along with the multiplexing and converting circuitry is controlled by a crystal-controlled clock and control logic network. The control logic network controls shifting of data out of the assembly register to plural head drivers and recording heads in association with a tape transport which receives a cartridge of magnetic tape operatively therein, and the record format requires recording of serial character recording in binary coded decimal form for each of real time plus a plurality of successive data channels, each channel carrying a sign indicator, and the format further including pre-parity and parity data indications denoting the end of each recording sequence.

Therefore, it is an object of the present invention to provide a light weight digital recorder which consumes minimal power and is capable of accepting either analog or direct-input digital data.

It is another object of the invention to provide digital recording apparatus having selectable recording rates which enable the capability of monitoring plural channels of input data over a long span of time with a relatively small amount of recording tape.

It is also an object of the invention to provide digital recording apparatus which utilizes a standard form of cartridge-contained magnetic recording tape.

Finally, it is an object of the present invention to provide a general purpose, plural channel data recording apparatus which is particularly desirable in operational or research oriented systems which may be limited in any of power, weight and/or space requirements.

Other objects and advantages of the invention will be evident from the following detailed description when read in conjunction with the accompanying drawings which illustrate the invention.

BRIEF DESCRIPTION OF THE DRAWINGS

FIG. 6 is a logic diagram illustrating interconnection of components making up the control logic circuitry and the circuitry associated with the parallel-to-serial converter.

DETAILED DESCRIPTION OF THE INVENTION

Figure 1:
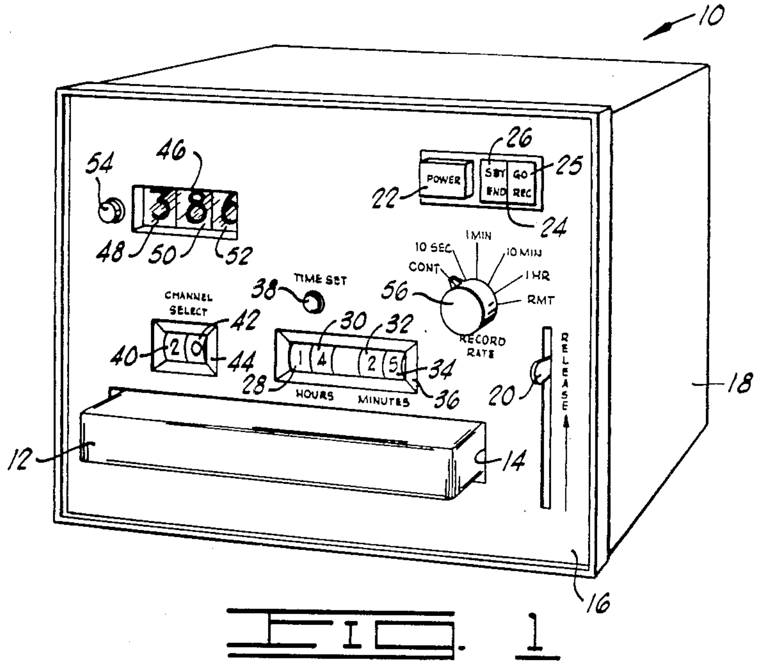
FIG. 1 is a perspective view of the recording apparatus illustrating the front panel and control dispositions.

Referring to FIG. 1, the digital recorder 10 is adapted to receive a cartridge 12 within an entry slot 14 formed in the lower central portion of a front panel 16 of a recorder cabinet 18. The record cartridge 12 is a standard form of commercially available type having an endless loop of magnetic tape included therein. One form of tape cartridge which has been utilized to very good advantage is a transcription cartridge containing 1200 feet of ¼-inch magnetic tape known as a "-Fidelipac" cartridge as obtained from Conley Electronic Corporation of Evanston, Illinois.

The digital recorder 10 utilizes a recording tape transport of conventional type for function with the cartridge-type recording tapes. One type of transport which has been proven in operation is a model A–4500 transport which is commercially available from the Auricord Division of Scovill Corporation, New York, N.Y., such transport unit being obtained as a complete recording apparatus including drive capstans, idlers and drive motor as energized by 12 volts d-c. Other idler and tape tensioning devices (not particularly shown) may be mounted on or about the transport to aid in the particular application, such additions of structure being well within the skill of the design engineer. The recording heads (not shown in FIG. 1), as utilized in conjunction with the tape transport of digital recorder 10, consist of four serially juxtaposed recording heads affixed to the transport for transverse alignment across the recording tape, and such recorder heads may be selected from various commercially available types, e.g. a type 1000 "Nortronics" recorder head as employed for four track applications.

Insertion of the tape cartridge 12 within entry slot 14 will automatically lock into the inward, operative position and raising of a release lever 20 will unlock tape cartridge 12 for removal. The digital recorder 10 is initially turned on by depression of a power switch 22, and the start of recording is initiated by actuation of a mode switch 24, more particularly a "GO–REC" indicator-switch 25. A "SBY-END" indicator-switch 26 is actuated either through push-button depression, or automatically upon end-of-tape sensing, to place the recorder in its standby condition. The mode switch 24 may be such as a commercially available pushbutton switch having four segment display.

Real time selection is made by dialing the desired hours and minutes through manipulation of thumb wheels 28, 30, 32 and 34 which are accessible through an escutcheon 36. Upon dialing the desired number of hours and minutes for recording operation, a "time set" push button 38 is depressed to actuate the time requirement. The seconds counter, as will be further described below, is automatically set to zero when the button 38 is pressed. A pair of thumb wheels 40 and 42 within an escutcheon 44 serve to select a particular recording channel for monitor indication. Digital values for the selected monitor channel are presented in a channel display 46. Channel display 46 is comprised of three nixie-type numeral display indicators 48, 50 and 52, and an indicator lamp 54 provides indication of the polarity of the selected analog input voltage, indicator 54 being illuminated when the analog input voltage is negative.

A selector switch 56 allows selection of recording intervals. Thus, manipulation of selector switch 56 enables recording to proceed continuously, once every ten seconds, once every minute, once every 10 minutes, once every hour, or upon remote command only. Four record segments or eighty channels of digital data are recorded once during each time interval. Thus, it can be seen that selector switch 56 enables great flexibility in the period of sampling and recording of incoming data, such that the digital recorder 10 is extremely adaptable as regards the type and quality of incoming data.

Figure 2:
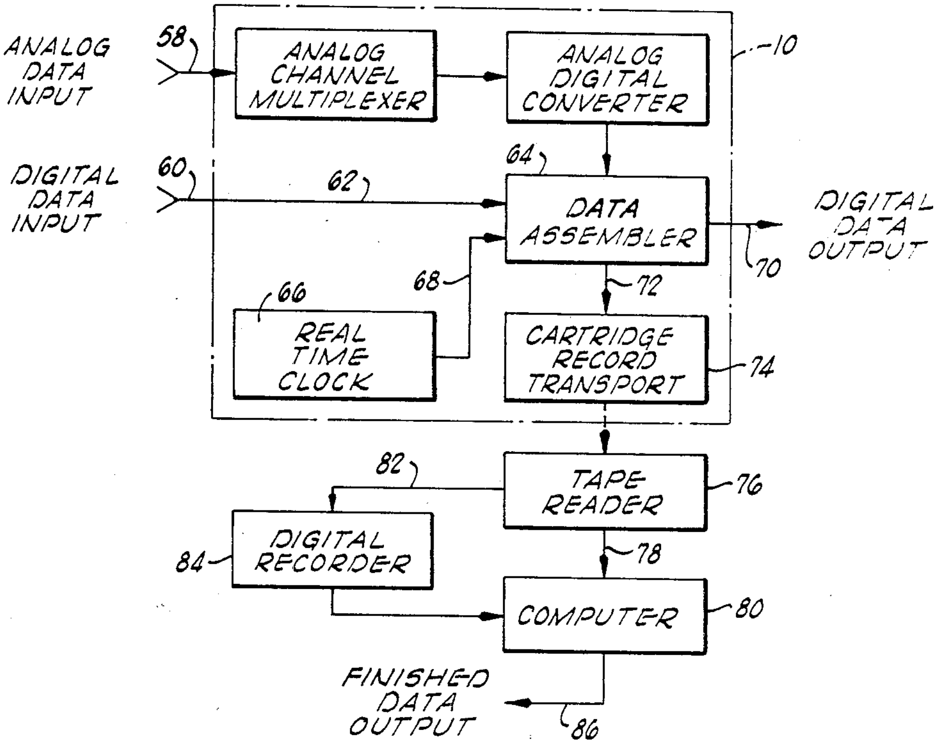
FIG. 2 is a general block diagram of a data processing system utilizing the recording apparatus of the present invention.

Referring now to FIG. 2, the digital recorder 10 may receive either analog data input at input 58 or digital data input at an input 60. In the event that digital data is received at input 60 it is applied via line 62 directly into a data assembler stage 64. The data assembler 64 also receives digital data relating to real time from a real time clock stage 66 via line 68, and data assembler 64 provides shift functions which reconstitute the data format to compatability. The data assembly 64 may provide an output via line 70 to related peripheral equipment or an output line 72 to the recording heads and cartridge record transport 74 for placement in digital format on the magnetic tape cartridge.

After recording on a tape cartridge such as cartridge 12 of FIG. 1, the individual cartridges can be stored, transported or otherwise processed for utilization of the digital information born thereon. Thus, a tape cartridge may be applied to a tape reader 76 which is adapted for the particular format presentation, and tape reader 76 may provide a computer-compatible output directly via line 78 to a digital computer 80, or it may provide an output on line 82 through an additional digital recorder 84 at selected format to the computer 80. Thereafter, finished data output is available on an output 86 after having undergone whatever processing and finishing functions within computer 80.

Figure 3:
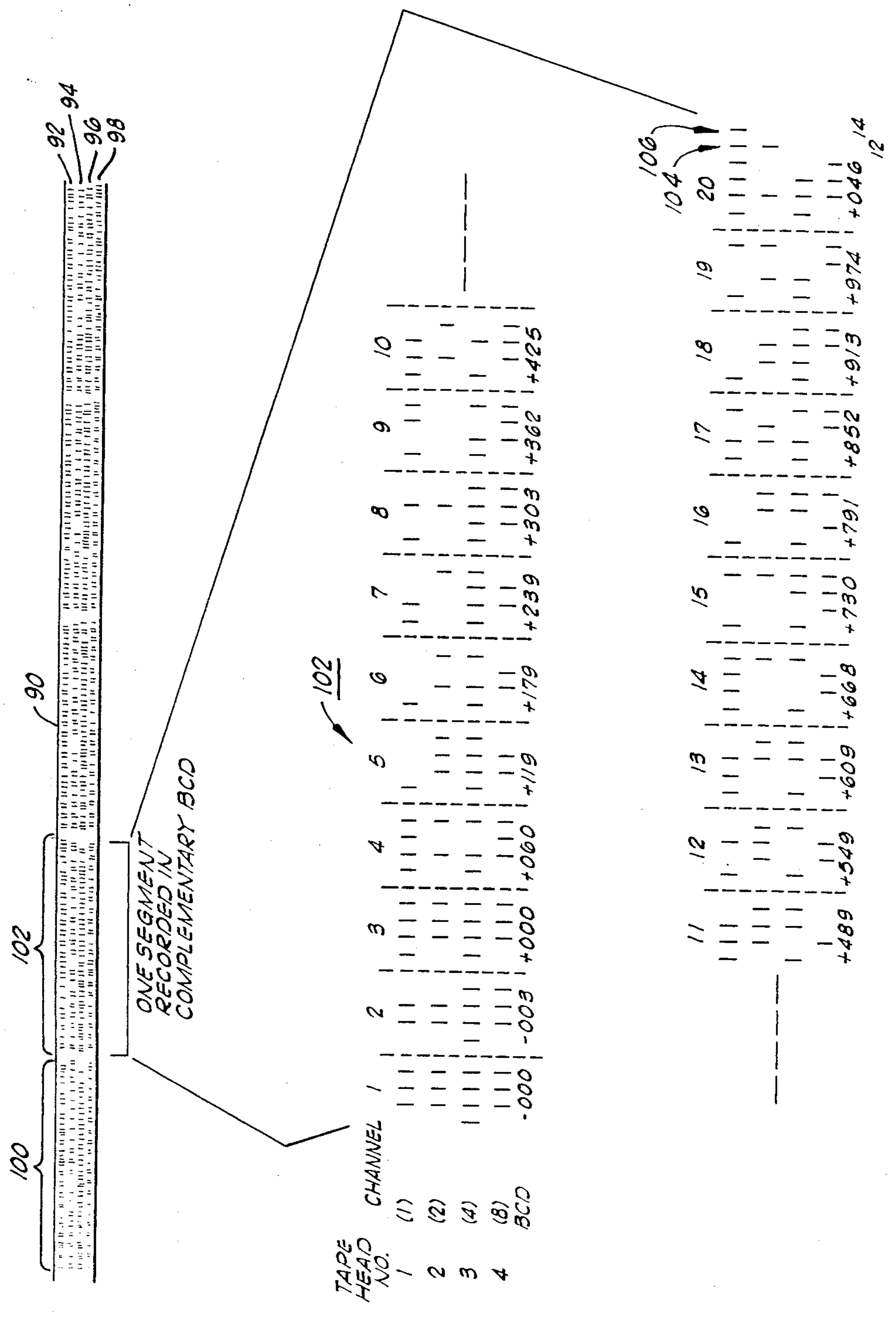
FIG. 3 is an idealized picture of a segment of recording tape as recorded in accordance with the present invention and having a single record segment shown in enlarged, descriptive form.

FIG. 3 illustrates a portion of magnetic tape 90 and the manner in which digital information is recorded in four record tracks 92, 94, 96 and 98 in each of a succession of record scans or segments 100, 102, etc. The record segment 102 is shown in enlarged form to fully illustrate the recording pattern. Record segment 102 is recorded in binary coded decimal complement indication, hereinafter referred to as BCD complement digital language as recorded in four longitudinal record tracks through 20 successive information channels. Thus, tape heads Nos. 1, 2, 3 and 4 are utilized to record the respective one-bit, two-bit, four-bit and eight-bit of the BCD complement digital code.

Channels one and two of record segment 102 carry two three-character BCD channels of real time with two serial digits each for hours, minutes and seconds. The remaining 18 channels of record segment 102 carry three-character BCD complement data plus a sign character, i.e., the first character in each channel is utilized to convey sign. Thus, the sign character is conveyed as either a BCD complement 1010 indication for positive sign, as shown in record channels 3 through 20, or as a 0010 indication to represent negative sign, as shown in real time channels one and two. With the first of four characters in each channel representing the value sign, the remaining three characters convey the digital value as sampled at that particular time for the selected channels. At the end of record signal 102 after recording of the four characters for channel twenty, a preparity recording is placed at a character space 104 and, upon logical satisfactions as will be further described, a longitudinal parity bit may be recorded at character point 106 to signify readiness for commencement of the next succeeding record segment along magnetic tape 90. The 12 and 14 BCD complement bit formations are utilized for pre-parity and parity, respectively.

Figure 4:
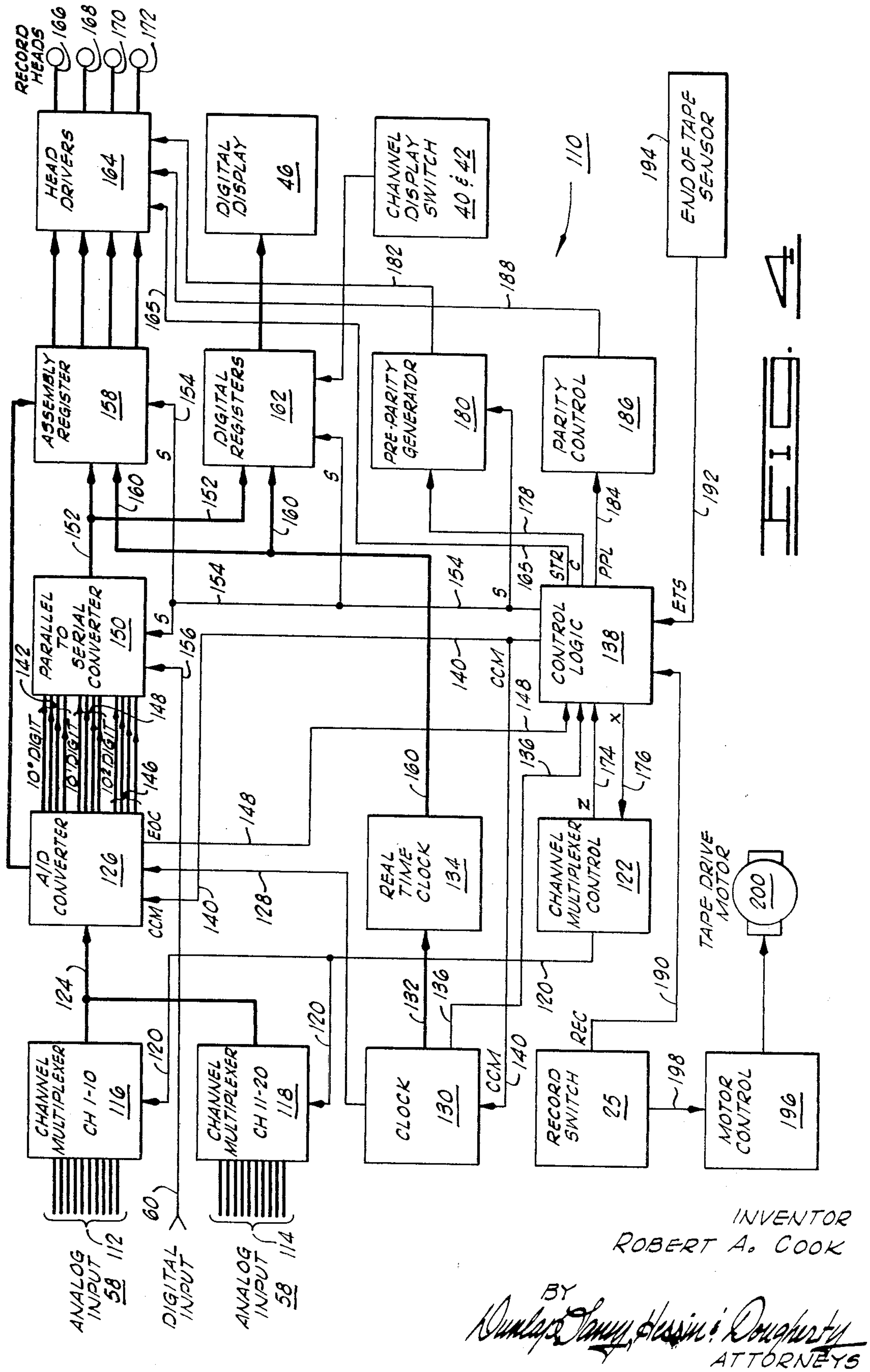
FIG. 4 is an overall block diagram of digital recording apparatus constructed in accordance with the present invention.
Figure 4:
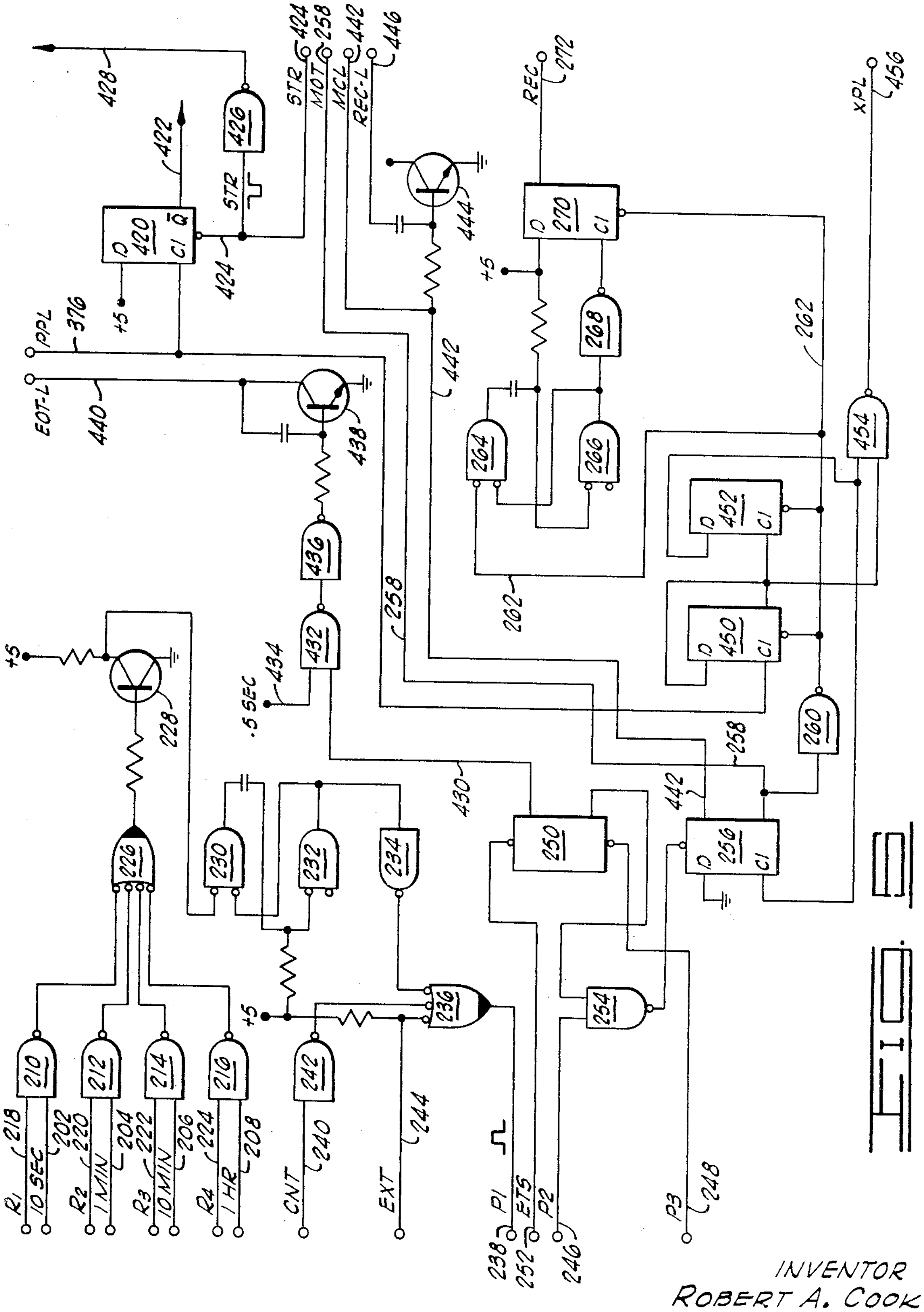

Referring now to FIG. 4, digital recorder circuitry 110 is adapted to receive digital input 60 as well as analog input 58, analog 58 being in the form of a plurality of separate groups 112 and 114 of individual analog signal inputs, each of input groups 112 and 114 being applied to respective channel multiplexers 116 and 118. For example, the channel multiplexer 116 may receive the plurality of channels one-to-10 of analog input while channel multiplexer 118 may receive additional channels 11-to-20. Each of channel multiplexers 116 and 118 may be a conventional form of multiplex circuitry of the time sequential sampling type and each stage receives timing control input via lead 120 from a channel multiplexer control stage 122. Channel multiplexers 116 and 118 may be any of various forms of time-sequential analog multiplexing circuit responsive to channel multiplexer control 122 to provide output on a line 124 of sequential analog signal samples for each successive channel of input information. The lead 124 is then applied to an analog/digital converter 126 which serves to convert each successive analog signal value to its respective three digit BCD complement value.

The analog-to-digital converter 126 receives timing input via line 128 from a masterclock 130 which provides the basic system timing. The clock 130 may generate control timing by employing such as a 1 mhz crystal-controlled oscillator operating through an output buffer stage, which 1 mhz signal is then divided through a series of decade counters, e.g., Signetics N8280A, in order to obtain a plurality of different, successively divided-down frequency outputs. The clock oscillators presently employed have crystal accuracy of 0.001 percent for a temperature range of −30° to +60° C. The divided outputs from the basic frequency or 1 mhz oscillator provide successive outputs of 100 khz, 10 khz, 1 khz, 100 hz, 10 hz, 2 hz and 1 hz, which divided outputs are variously employed throughout the system and particularly as applied via line 132 to a real time clock 134, to be further described below. The clock 130 also provides basic timing signal at 1 khz via line 136 to the central control logic 138, to be further described, which, in turn, generates a CCM output for application on lead 140 to each of the analog to digital converter 126 and clock 130. The CCM signal acts as a conversion command to the a/d converter 126.

The a/d converter 126 provides BCD output for each of the tens, units and hundreds digits, i.e. the $10^0$ digit, $10^1$ digit and $10^2$ digit, via respective four conductor lead groups 142, 144 and 146. At the end of conversion of each of the successive channel sample values, an EOC signal output is provided via line 148 for control input to control logic 138. The EOC signal conveys signification of the end of analog-to-digital conversion for a particular channel.

The a/d converter 126 may be a standard form of converter circuit as available in module construction for integration within system circuitry, e.g., as selected from CDL Logic Elements of Signetics Corp., Sunnyvale, Cal., it only being necessary to adapt the time sequencing requirements of input, and selection as to code and character output. Thus, the BCD character output via lead groups 142, 144 and 146 are each applied to a parallel-to-serial converter 150.

The parallel to serial converter 150 is also comprised of conventional shift register circuitry, e.g., parallel-entry shift registers, Signetics type N8270A, which serves to accept BCD digital values for each character of a digital word or channel indication in parallel and, thereafter, to shift the individual BCD characters onto an output 152 in serial form. Thus, an S pulse on a lead 154 from control object 138 provides shift command signal to the various data registers within the parallel-to-serial converter 150.

It may be noted that it is at this point that digital input at input 60 may be applied via a lead 156 directly to the parallel-to-serial converter 150. Thus, if the format, as received at digital input 60, is a parallel configuration, the converter 150 is utilized to store and reshift data out on lead 152 in serial BCD form; however, digital input data may be received in proper code format in the first place whereupon jumper circuitry may be included to provide the digital input data directly to the data supply lead 152.

The data supply lead 152 bearing serial BCD complement characters of sequential channels of digital data is applied to an assembly register 158 which receives the input data for shifting therethrough. Assembly register 158 also receives shift pulses on lead 154 from control logic 138 to maintain synchronism of shifting with the prior stage, the parallel-to-serial converter 150. The real time clock 134 receives output on lead 132 from clock 130 to provide a real time code output on a lead 160 for input to assembly register 158. Actually, real time clock 134 consists of a series of fixed decade counters (e.g. Signetics N8280A, Presettable Decade Counters) connected in series and responsive to 1 hz pulses to provide a real time count. The maximum count in accordance with present design is 23 hours, 59 minutes and 59 seconds, whereupon real time clock 134 reverts to zero count. The real time clock 134 generates 24 bits of data in the output, these 24 bits being applied to the first two record channels (channels 1 and 2 of FIG. 3). Twelve bits are transferred in parallel into two 12-bit registers for shift to serial BCD complement characters on the output lead 160 as applied to assembly register 158.

The BCD complement character data on both of leads 151 and 160 is applied in parallel form to assembly register 158 as well as to digital registers 162 which control data to front panel digital display 46. Thus, a selected channel of data, as dialed by thumb wheel switches 40 and 42 (FIG. 1), will be displayed in Nixie-type representation on digital display 46 with continual updating of the display information, such updating of data taking place once every four record segments to provide redundancy.

BCD complement digital output is shifted out of assembly register 158 through respective head driver circuits, designated generally as head drivers 164, whereupon the head drivers 164 apply the digital bit information to each of respective record heads 166, 168, 170 and 172. Head drivers 164 may consist of such as a parallel array of flip-flop, power amplifier circuits to provide binary record indication in a manner well-known in the art.

A control logic stage 138, as will be more fully described below, provides a plurality of control signals for application to various stages of the digital recorder circuitry 110 to effect actuation of the numerous pulse stages. Thus, control logic 138 receives a Z signal on a lead 174 from channel multiplexer control 122, and this provides pulse indication as to when a last channel of a record segment has been sampled. The control logic 138 also provides an X pulse output on a line 176, and this X pulse provides a signal indicating time for switching to the next successive channel in the multiplex process. Control logic 138 provides a C pulse output on a lead 178, a character count output, which is applied to a pre-parity generator 180. The pre-parity generator 180 responds to character count to place BCD complement "12" indication to be shifted into a register for placement via line 182 into head driver 164 upon the first character count after completion of the 20 four character channels of information. A PPL pulse from control logic 138 on a line 184, a longitudinal parity signal, is applied to a parity control circuitry 186 which causes a longitudinal parity pulse output on line 188 to be written through head drivers 164 thereby to designate the last character of the record segment.

The record switch 25 provides an REC signal output on a lead 190, a record command output, which is also applied to control logic 138 to start and stop various control logic functions. Still another ETS input signal on line 192 from end-of-tape sensor 194 provides a stop pulse indication to the control logic 138. The end-of-tape sensor may comprise any of various structures; however, one method employed to good advantage is to use a reflective marker, formed integral with the tape of tape cartridge 12 (FIG. 1), which marker is read photo-optically to provide an output signal indicative of end-of-tape. The ETS output signal is then utilized to take the recorder out of record mode automatically. A light source and photocell may be mounted near the recording heads 166–162 in known manner to sense the presence of the reflective marker.

A motor control stage 196 is energized responsive to input on lead 198 from record switch 25 to effect energization of a tape drive motor 200 of selected type. The drive motor 200 may be such as an Auricord governor-equipped d-c motor operated on +12 volts d-c and, in a present construction of the invention, a braking voltage of −25 volts is utilized to provide fast stopping through dynamic braking.

Figure 5:
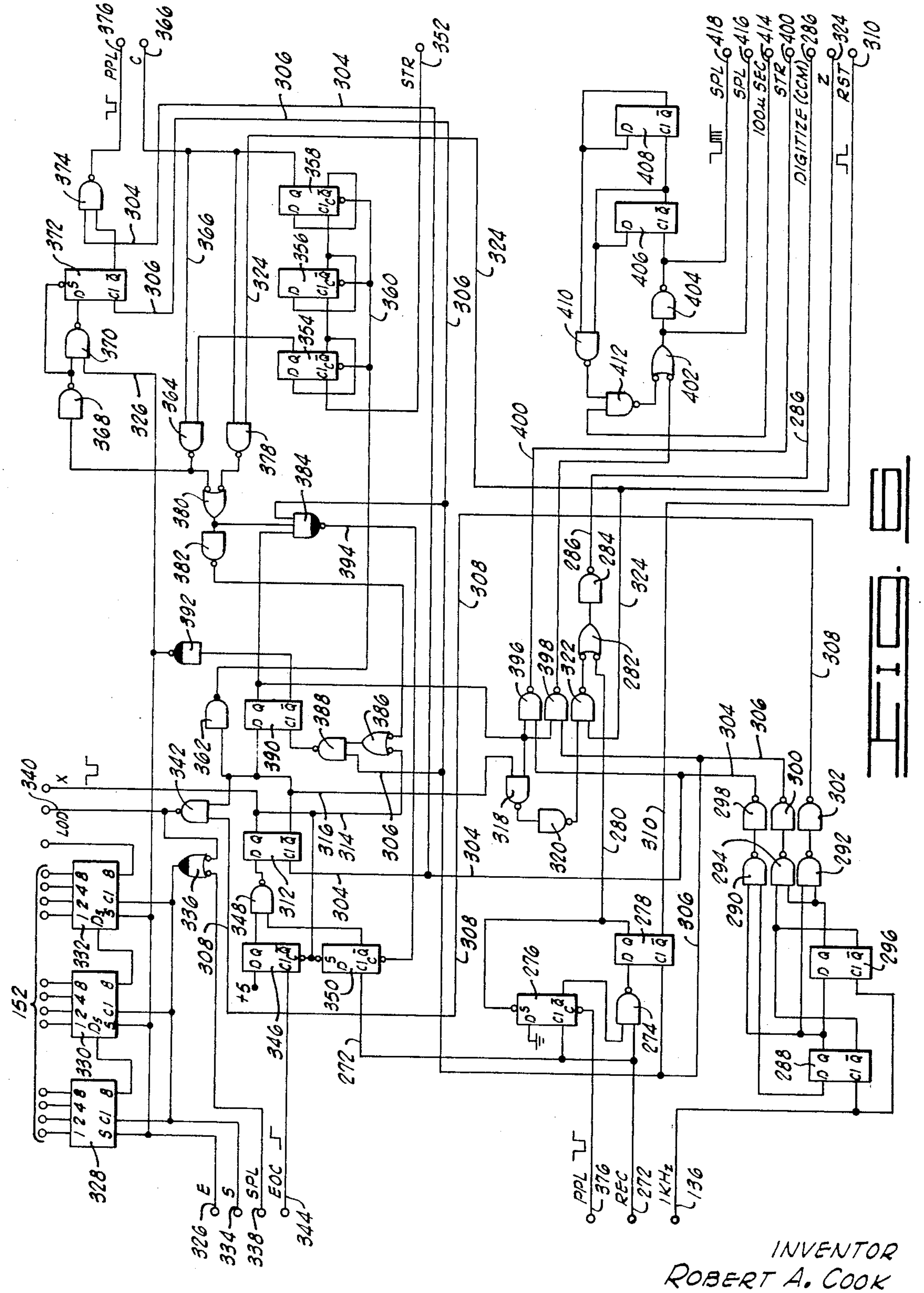
FIG. 5 is a logic diagram showing the interconnection of components making up a portion of the control logic circuitry.

Referring now to FIGS. 5 and 6, the schematically illustrated control logic circuitry provides a source for all basic timing and switching functions thereby to coordinate operation of the digital recorder 10. Enabling inputs 202, 204, 206, and 208, as derived from front panel interval selector 56, are applied to enable respective AND gates 210, 212, 214 and 216. Upon coincidence of inputs R1–R4, positive clock output pulses as applied on respective leads 218, 220, 222 and 224, the AND gates 210 through 216 will provide an output on a respective lead to OR gate 226 and switching transistor 228. Upon switching of transistor 228, a one-shot circuit consisting of AND gates 230 and 232 provide an output which is applied through gate 234 to an OR gate 236 to generate a P1 output 238. A continuous mode output CNT from selector switch 56 is applied on a lead 240 through a gate 242 for input through OR gate 236 also to generate a P1 output, and there is further provision for remote recording command with EXT input applied on a lead 244 through the similar OR gate path.

The front panel indicator-switch 25, the "GO-REC" switch, may be depressed to connect lead 238, the P1 output, to a P2 lead 246. Connection of P1 to P2 removes blocking potential on P3 lead 248 through energization of flip-flop 250. Flip-flop 250 then remains in this conduction until the end of recording when an ETS or end-of-tape pulse is applied on lead 252 for application to flip-flop 250 thereby causing it to go to the set conduction condition. However, prior to end-of-tape, flip-flop 250 provides enabling to AND gate 254 along with P2 pulse 246 to place flip-flop 256 in set conduction to provide pulse output on a lead 258 to start drive motor 200 and maintain it energized throughout a recording sequence. The motor pulse on lead 258 also passes through AND gate 260 to provide output pulse on lead 262 which triggers a one-shot circuit consisting of AND gates 264 and 266. The one-shot AND gates 264 and 266 provide pulse output after a delay of about one-half second with output applied through AND gate 268 to cause a flip-flop 270 to go into set conduction thereby to generate a record command or REC pulse output on a lead 272. The time delay employed by one-shot gates 264 and 266 enable the motor 200 to reach proper operational speed before recording commences.

The record command REC pulse serves to start and stop various control logic functions. Thus, referring to FIG. 6, the REC pulse input on lead 272 is applied through AND gate 274 as enabled by pulse output from a flip-flop 276 in response to the REC pulse. The output from AND gate 274 is then applied to trigger the flip-flop 278 which provides a pulse output on lead 280 through an OR gate 282 and AND gate 284 to provide output digitized command or CCM pulse on lead 286.

Figure 7:
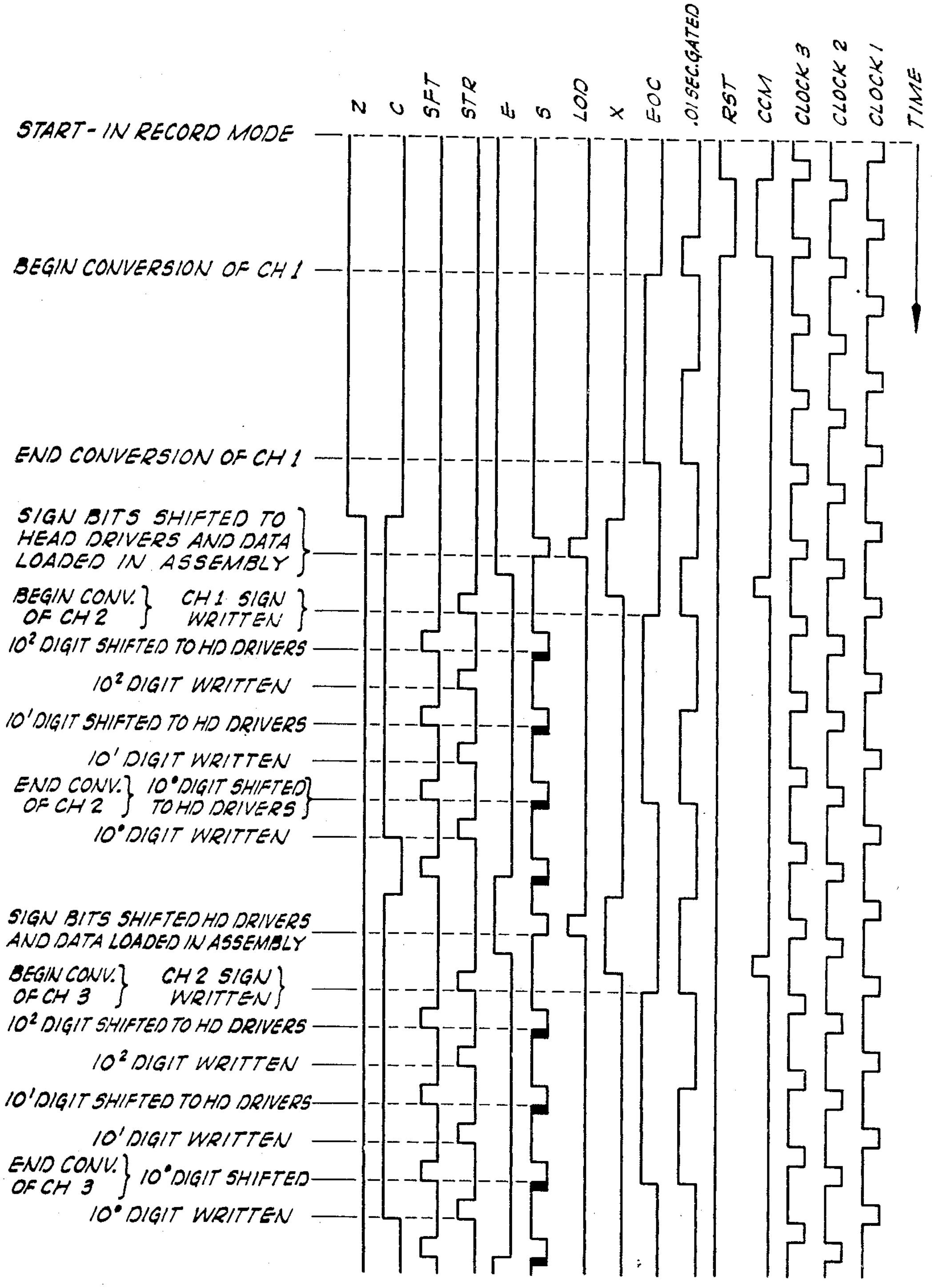
FIG. 7 illustrates a series of pulse wave forms aligned in time relationship illustrating the order of switching and enablement for selected, key circuit functions of the invention.

The 1 KHZ signal is applied in at lead 136 as derived from clock stage 130. The 1 KHZ signal is applied to a clear input of flip-flop 288 which provides a first pulse output as enabling input to AND gates 290 and 292 with the remaining pulse output applied to enable an AND gate 294. Conversely, the 1 KHZ input is applied to the clear input of a second flip-flop 296 which applies a first output as input to each of AND gates 292 and 294 while the other remaining flip-flop output is applied to AND gate 294, and the flip-flops 288 and 296 coact to produce a four-phase working clock. Since only three phases are needed, the fourth output is not generated. Thus, output from gates 298, 300 and 302 on respective leads 304, 306 and 308 represent the clock 1, clock 2 and clock 3 pulses, respectively. As shown in FIG. 7, the clock 1, clock 2 and clock 3 pulses are each generated at successive different times for application as timing pulses throughout the logic network as will be further described.

A first leading edge of a clock 2 pulse after the REC pulse goes positive will cause flip-flop 278 to reverse conduction and this, in turn, actuates flip-flop 276 to reverse conduction. Flip-flop 278 will remain in this state until the next leading edge of a clock 2 pulse at which time flip-flop 278 will return to its previous conductive state. This causes flip-flop 278 to produce one 4 millisecond negative pulse on lead 280 and, at the same time, flip-flop 278 produces one 4-millisecond positive pulse, the reset pulse for channel multiplexing, as output on a lead 310. A flip-flop 312 is in set condition such that a positive pulse is applied via lead 314 and a negative going pulse is present on lead 316 through AND gate 318 and 320 to AND gate 322. A Z pulse on a lead 324 is also applied to AND gate 322 such that it will be in high conduction, and a four millisecond negative pulse produced by flip-flop 278 will be conducted as the convert command or CCM pulse on lead 286 to command digitization in analog-to-digital converter 126. The control logic is normally engaged in processing previous channels, if any, while the analog-to-digital converter 126 is performing a conversion.

An E pulse input on lead 326 is applied through the set input of registers 328, 330 and 332, the parallel-to-serial converter registers of parallel-to-serial converter 150, with outputs being available on respective 1, 2, 4 and 8-bit outputs of each register designated generally by numeral 151 (See also FIG. 4). An S pulse from input 334 is applied to clear input of registers 328, 330 and 332 as is, alternatively, the output from OR gate 336 which applies either an SPL pulse (as will be further described) received in on lead 338, or an LOD pulse as present on lead 340 from AND gate 342. The LOD pulse is present from AND gate 342 with coincidence of clock 3 input on lead 308 and output $\bar{Q}$ from flip-flop 312 as controlled by clock 1 pulses.

An end-of-conversion or EOC pulse is present on lead 344 as clear input to a flip-flop 346 which provides a Q output to AND gate 348 in series with flip-flop 312. A flip-flop 350 is interconnected with flip-flop 346 to receive clear input on lead 272 and to provide $\bar{Q}$ output for application to AND gate 348.

An STR pulse, a character count command, is applied on a lead 352 to clear input of a flip-flop 354 which is connected in series with flip-flops 356 and 358 to act as a character counter. Thus, each of flip-flops 345-358 are reset by input on lead 360 from AND gate 362 and a $\bar{Q}$ output of flip-flop 312. A first count output from flip-flop 354 is applied to AND gate 364 in parallel with Q output from flip-flop 358 on lead 366. The output from AND gate 364 is then applied through AND gate 368 and 370, as compared with E pulse presence on lead 326, for application to D input of a flip-flop 372. The $\bar{Q}$ output of flip-flop 372 is then applied with clock 1 pulse on lead 304 to AND gate 374 to derive a negative-going PPL pulse output on a lead 376. Clear input to flip-flop 372 is obtained from lead 306 carrying clock 2 pulse energy.

The C pulse output of character counter flip-flop 358 on lead 366 is applied to AND gate 364 as well as to a parallel AND gate 378. AND gate 364 is conducted in response to coincidence Q pulse output from flip-flops 354 and 358 to provide pulse conduction through an OR gate 380. Similarly, coincidence output of Q pulse from flip-flop 358 and Z pulse present on lead 324 will also provide pulse output through OR gate 380 on completion of count. The output from OR gate 380 is utilized through each of AND gate 382 and 384. The output from AND gate 382 is then applied through an OR gate 386 and series-connected AND gate 388 which receives clock 2 enabling input from lead 306 to provide AND output to the clear input of a flip-flop 390. The flip-flop 390 then provides a $\bar{Q}$ output through AND gate 392 which is connected to the E pulse lead 326 and AND gate 370 in the PPL pulse circuit. The output from OR gate 380 is applied to AND gate 384 coincident with clock 2 output on lead 306 as well as Q output from flip-flop 390 to produce gate output on a lead 394 to reset flip-flop 350.

The Q output of flip-flop 390 is connected to one input of each of AND gates 396 and 398 which also receive inputs from clock 1 and clock 2 pulse leads 304 and 306, respectively. Output from AND gate 396 is applied on a lead 400 as the STR pulse, a character count command output on strobe pulse. Output from AND gate 398 is applied through an OR gate 402 and AND gate 404 to the clear input of a flip-flop 406. The $\bar{Q}$ output of flip-flop 406 is then connected serially to the clear input of a flip-flop 408, flip-flops 406 and 408 being energized alternately to function as a shift pulse generator. The $\bar{Q}$ output flip-flop 408 is recycled in parallel with $\bar{Q}$ output from flip-flop 406 through an AND gate 410 for input to an AND gate 412 which also receives a 100 microsecond pulse on a lead 414. Output from AND gate 412 is then conducted through OR gate 402 where a first SPL output, a shift pulse output, is present on a lead 416, and a second SPL output is taken from the output command gate 404 via lead 418.

Referring again to FIG. 5, the PPL pulse on lead 376 is also applied to the clear input of a flip-flop 420. The $\bar{Q}$ output pulse from flip-flop 420 on a lead 422 is then utilized for reset of flip-flop stages within head drivers 164. A pulse output taken on a lead 424 is utilized as the STR pulse, the write data strobe pulse, the STR pulse also being applied through an AND gate 426 and output lead 428 for use as an enabling signal input functioning with AND gates or such which control input to each of the recorder head driver circuits within head drivers 164. Flip-flop 250 is actuated by end-of-tape signal or ETS pulse on lead 252 to provide pulse output on a lead 430 to AND gate 432 as enabled by a 0.5 second input pulse on a lead 434 thereby to provide an output through an AND gate 436 to energize a transistor stage 438 to generate an EOT pulse output, i.e., end of tape actuation, on a lead 440.

Flip-flop 256 provides energization on output lead 442 as an MCL pulse, i.e., a motor control signal. The MCL signal is also applied to the base of a transistor stage 444 with a REC-L pulse taken off of the base for output on a lead 446. The REC-L pulse on lead 446 is applied to energize a front panel light, an integral part of the "GO-REC" indicator-switch 25, which indicates that the recorder is energized and recording.

A remaining pulse output on lead 258 from flip-flop 256, the MOT pulse, is applied through AND gate 260 to reset each of flip-flops 450 and 452 as well as the REC output flip-flop 270. Flip-flop 450 receives clear input from PPL pulse on lead 367 and a pulse output from flip-flop 450 is applied to one input of an AND gate in parallel with a second input derived from the clear input of flip-flop 256, and the output of AND gate 454 is present on the lead 456 as the XLP pulse, an updating pulse which changes state after registering four previous PPL pulses. The XPL pulse is utilized to enable data displayed in digital display 46 of the front panel to be updated once every four record segments. The fourth PPL pulse also provides simultaneous clearing of flip-flops 256, 450 and 452.

FIG. 7 shows the time sequence relationship of various pulses operating within the control logic 138. Thus, each of clock 1, clock 2 and clock 3 pulses are reproduced in accordance with count of a 1 KHZ precision pulse from clock 130 to produce the progressively staggered clock pulse relationship. The CCM pulse provides conversion command to the analog to digital converter 126 to signal commence digitizing of analog information presented thereto from channel multiplexers 116 and 118. Immediately thereabove, the negative going RST pulse provides reset for the channel multiplexer. The 0.01 second gated pulse determines the length of analog to digital conversion time, and a synchronized EOC pulse signifying end of conversion in each instance.

The X pulse is a negative 4 millisecond pulse which is applied to the analog channel multiplexers 116 and 118 for the purpose of advancing the multiplexer to the next channel through successive scans. The LOD pulse is constructed in response to timing of the X pulse to signify the load function of shifting data into respective registers of the parallel-to-serial converter 150. The S pulse then serves to signal shifting of the data registers to provide sequential sifting of the data out of parallel-to-serial converter 150 into the assembly register 158. The E pulse controls serial shifting of the registers and it also enables succeeding STR and SFT pulses, for strobe and shift respectively, as well as enabling of the CCM pulse generation circuit. Finally, the C pulse clocks output of the character counter of parallel-to-serial converter 150 while the Z pulse signals writing of the last data character.

OPERATION

The digital recorder 10 may be utilized to record plural channels of input data of various types, and it is particularly suited for applications where there may be limitations as to size, available space, available power or any combination of these. Thus, for the case of analog data inputs, digital recorder 10 may receive up to 18 channels of high impedance differential analog input. The recording intervals are selected by a selector switch 56 on the front panel of digital recorder 10. Up to 60 minutes of continuous recording is possible with a single endless-loop tape cartridge 12. However, this time can be extended almost indefinitely by selected slower recording intervals or utilizing remote record control. Digital data input can also be utilized as direct input, but the present description proceeds with respect to analog data input.

Analog input data applied at inputs 58 are sequentially sampled in channel multiplexers 116 and 118 for introduction into the a/d converter 126. A/d converter 126 operates under control of control logic 138 to digitize each successive analog channel sample t a binary coded decimal digital output in three decimal digits. Thus, the output from the a/d converter 126 provides 1-, 2-, 4- and 8-bit binary outputs in BCD complement code on each of lead groups 142, 144 and 146 which represent the $10^0$ digit, the $10^1$ digit and the $10^2$ digit, respectively. A CCM pulse (FIG. 7) provides an output to a/d converter 126 from the control logic 138 to signify digitization of whatever analog sample value presented at that time. Thus, each CCM pulse signifies the start of digitization for a single channel of the successive data channels making up the particular record segment. An EOC signal, a binary pulse originating in the a/d converter 126 is supplied to control logic 138 to indicate the end for each channel of conversion to digital BCD output.

The BCD data on lead groups 142, 144 and 146 is then placed in respective registers within parallel-to-serial converter 150. Shift pulses S from control logic 138 (See FIG. 7) then control sequential shifting of the BCD data out of parallel-to-serial converter 150 and into related shift register within each of the assembly register 158 and the digital registers 162. BCD digital data shifted out of assembly register 158 is applied serially to head drivers 164 and plural record heads 166–172, and a periodic STR pulse, the strobe pulse from control logic 138, provides write command to record heads 166–172.

The data shifted out of assembly register 158 consists of twenty consecutive four-character data words, each character consisting of four simultaneous bits as applied through head drivers 164 to respective ones of four-track recording head 166–172. The first character in each data word or record channel (FIG. 3) is utilized to convey sign, and the remaining three convey $10^0$, $10^1$ and $10^2$ digital code, respectively. As presently constituted, the recording sequence of digital recorder 10 allots channels 2 through 20, a total of 18, for data information, while channels 1 and 2 are used to cove real time in hours, minutes and seconds.

The real time digital signals are generated in real time clock 134 in conventional manner for output via line 160 to each of assembly register 158 and Digital Registers 162. Real time is automatically generated in BCD complement and recorded on the tape in channel 1 and channel 2 positions. The real time clock 134 counts 1 hz pulse output from clock 130, e.g., as by using six decade counters (N8280A Signetics Presettable Counters) connected in series, to generate 24 bits of data equated to time. Twelve such bits are transferred in parallel through each of two 12-bit registers (not shown) whereupon successive four-bit data characters are shifted out sequentially, two characters each for hours, minutes and seconds. The sign character in each of channels 1 and 2 is filled out as a bit shift indication.

BCD data held within digital registers 162 is also available to be shifted out for representation in a digital display 46. The digital register 162 is controlled by the front panel thumb wheels 40 and 42 such that only BCD data for a particular data channel is held in register for display in the digital display 46. Thus, the digital display 46 provides a means for operator monitoring of one or more data channels in selective sequence.

The recording operation may be either intermittent or remotely controlled as exercised through front panel switch 56. Intermittent operation at various interval selections is made by setting of selector switch 56 which places enabling output on a respective AND gate 210, 212, 214 or 216 and, upon receipt of the selected clock pulse on leads 202, 204, 206 or 208, output is applied through OR gate 226 to turn off transistor 228 thereby to actuate one-shot AND gates 230–232 to produce a P1 pulse through OR gate 236 on lead 238 which will initiate the record mode. That is, lead 238 is in contact with P2 pulse lead 246 due to initial turning on of the recorder 10 and P2 pulse output operates through AND gate 254 and flip flops 256 and 270 to generate the REC record output at lead 272 for application to motor control 196 and drive motor 200. The similar P1 pulse enablement is also effected through OR gate 236 by presence of a CNT pulse on lead 240 to control continuous recording, or an EXT pulse on lead 244 as may be applied continuously or periodically from a remote position.

The digital recorder 10 also includes provision for longitudinal pre-parity and parity record indications at the end of each record segment. That is, after recording of twenty successive data input values, each represented as a three character BCD recording in four tracks, a pre-parity generator 188 is controlled in response to a C pulse, a character count output, to generate a signal output on lead 182 to head drivers 164. Actually, the C pulse is generated in response to a pre-determined count of strobe pulses STR as applied in on lead 352 to flip-flop counters 354, 356 and 358 (See FIG. 6). Control logic 138 also generates a PPL pulse, a longitudinal parity timing pulse, for output to parity control 186, which PPL pulse effects writing of parity bits through head drivers 164 and record heads 166–172 after proof of pre-parity writing at the end of the twenty channel record segment. The sign character for each channel is determined by the a/d converter 126 and placed in BCD form for entry into parallel-to-serial converter 150.

Thereafter, the sign character is shifted out by the first negative transition of the S pulse (See FIG. 7) to place a sign character into head drivers 164. This occurs at the same time that parallel data from the /d converter 126 is loaded into the registers of parallel-to-serial converter 150. The sign character is shifted out in BCD complement form as either a 10 or 11, 10 indicating a positive input and 11 indicating a negative input. Thus the sign characters are presented to the head drivers 164 by the first S pulse and, at the first STR pulse, head drivers 164 are actuated to low writing of the sign bits on the tape through record head 166–172.

The foregoing discloses novel digital recorder equipment which is particularly desirable for applications having limitations as to space or power, or other conditions as to movability and accessibility. The recorder has been found to be particularly applicable to uses aboard aircraft for monitoring certain plural channel telemetry receptions. In addition to having an efficient plural channel recording format, including real time, recorded on a standard form of magnetic tape cartridge, the recorder device includes provision for selected interval operation which serves to extend greatly the time and overall data collection per record cartridge.

Changes may be made in the combination and arrangement of elements as heretofore set forth in the specification and shown in drawing; it being understood that changes may be made in the embodiments disclosed without departing from the spirit and scope of the invention as defined in the following claims.

What is claimed is:

1. Recording apparatus for recording either analog or digital input data in digital form in plural channels on an endless loop magnetic tape cartridge, the apparatus comprising:

transport means receiving said tape cartridge in releasable operational affixture thereto, said transport means including plural recording heads disposed in parallel array across said tape in recording contact with said plural channels;

means receiving and converting each of a plurality of channels of input data signals to serial binary coded decimal pulse signals;

real time clock means generating serial binary coded decimal pulse signals indicative of real time;

assembly means for storing binary coded decimal information in register such that said real time binary coded decimal pulse signals are fist recorded on said tape cartridge upon initiation of the recording, and said plural channels of binary coded decimal data pulse signals are recorded subsequently thereafter, said binary coded decimal data pulse signals for each channel of data input being recorded in sequential disposition on said tape cartridge;

means for generating sequential preparity and parity pulse signals and for recording said sequential pulse signals on said magnetic tape serially after the last channel input of said plural channels of binary coded decimal pulse signals to signify termination of the recording sequence;

control logic means periodically energizing said transport means for one recording sequence; and selector means enabling said control logic means periodically at one of a plurality of selected real time periods.

2. Recording apparatus as set forth in claim 1 which is further characterized in that:

said selector means includes means responsive to remote control for initiating the sampling of plural analog input data through a predetermined number of record segments of information.

3. Recording apparatus as set forth in claim 1 wherein said means receiving and converting comprises:

converter means for receiving plural channels of analog input data and providing said plural channels of data as sequential binary coded decimal digital output; and parallel-to-serial converter means receiving said binary coded decimal digital output to provide a converted output of serial binary coded decimal pulse signals.

4. Recording apparatus as set forth in claim 3 which is further characterized to include:

digital register means receiving output from said parallel-to-serial converter means for storing binary coded decimal information in register to be shifted out as a display information output; and digital display means for receiving said display information output upon shifting out from said digital register means to provide visual indication of selected digital values.

5. Recording apparatus as set forth in claim 3 which is further characterized to include:

multiplexing means receiving each of said plural channels of analog input data to provide sequential output of samples of each channel of analog data for input to said converter means.

6. Recording apparatus as set forth in claim 5 which is further characterized to include:

marker means physically disposed on the tape of said tape cartridge at the end thereof;

sensor means responsive to said marker means disposed adjacent said plural recording heads of the transport means to provide a sensor output at the end of said tape for application to said control means thereby to cease energization of said transport means.

7. Recording apparatus as set forth in claim 5 which is further characterized in that:

each of said recording sequences of said magnetic tape cartridge includes first and second serial channels of serially arranged binary coded decimal digital indications representative of real time in minutes, hours and seconds, and further includes a succeeding plurality of sequential channels of digital information each representing a separate data channel input as represented in three sequential characters of binary coded decimal digital indications each preceded by a single character binary coded decimal digital indication representative of sign, said recording segment terminating with pre-parity and parity characters of pre-determined character representation.

8. Recording apparatus as set forth in claim 5 which is further characterized to include:

control means generating control output signals for controlling the rate of sampling of plural channels of analog input data, said control means providing synchronism for digitization in parallel-to-serial conversion of said input data.

9. Recording apparatus as set forth in claim 8 which is further characterized to include:

master clock means providing output pulses at precisely controlled rate to synchronize said control means control output signals.

10. Recording apparatus as set forth in claim 8 which is further characterized to include:

digital register means receiving output from said parallel-to-serial converter means for storing binary coded decimal information in register to be shifted out as a display information output; and digital display means for receiving said display information output upon shifting out from said digital register means to provide visual indication of selected digital values.

11. Recording apparatus as set forth in claim 10 which is further characterized to include:

channel selector means actuatable to select which channel of said plural channels of input data is presented for visual indication on said digital display means.

* * * * *